US008045047B2

(12) United States Patent
Nikkanen et al.

(10) Patent No.: US 8,045,047 B2
(45) Date of Patent: Oct. 25, 2011

(54) METHOD AND APPARATUS FOR DIGITAL IMAGE PROCESSING OF AN IMAGE HAVING DIFFERENT SCALING RATES (75) Inventors: Jarno Nikkanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 1068 days.

(21) Appl. No.: 11/166,790

(22) Filed: Jun. 23, 2005

(65) Prior Publication Data

US 2006/0290796 A1   Dec. 28, 2006

(51) Int. Cl.
*H04N 5/232* (2006.01)
*G03B 13/00* (2006.01)

(52) U.S. Cl. ............... 348/350; 348/345; 348/222.1; 348/333.11; 358/451

(58) Field of Classification Search .......... 348/345, 348/350
See application file for complete search history.

(56) References Cited

U.S. PATENT DOCUMENTS

| | | | | |
|---|---|---|---|---|
| 5,111,308 A * | 5/1992 | Bachar | ............... | 358/448 |
| 5,659,357 A * | 8/1997 | Miyano | ............... | 348/223.1 |
| 6,570,617 B2 | 5/2003 | Fossum et al. | | |
| 6,646,680 B1 | 11/2003 | Mead et al. | | |
| 6,839,452 B1 * | 1/2005 | Yang et al. | ............... | 382/103 |
| 6,906,751 B1 * | 6/2005 | Norita et al. | ............... | 348/349 |
| 6,972,799 B1 * | 12/2005 | Hashimoto | ............... | 348/350 |
| 7,469,064 B2 * | 12/2008 | Furuya et al. | ............... | 382/195 |
| 7,551,203 B2 * | 6/2009 | Nakayama et al. | ............... | 348/222.1 |
| 7,808,528 B2 * | 10/2010 | Massie et al. | ............... | 348/208.14 |
| 7,834,923 B2 * | 11/2010 | Stavely et al. | ............... | 348/308 |
| 2001/0012072 A1 * | 8/2001 | Ueno | ............... | 348/333.02 |
| 2002/0180877 A1 | 8/2002 | Kikuchi | | |
| 2003/0197784 A1 * | 10/2003 | Bae | ............... | 348/207.1 |
| 2004/0169767 A1 | 9/2004 | Norita et al. | | |
| 2004/0223073 A1 * | 11/2004 | Kanai | ............... | 348/345 |
| 2004/0246360 A1 * | 12/2004 | Stavely et al. | ............... | 348/333.11 |
| 2005/0068421 A1 | 3/2005 | Dutta et al. | | |
| 2005/0190270 A1 * | 9/2005 | Park | ............... | 348/222.1 |
| 2007/0076099 A1 * | 4/2007 | Eshed et al. | ............... | 348/218.1 |
| 2007/0250898 A1 * | 10/2007 | Scanlon et al. | ............... | 725/135 |
| 2008/0129857 A1 * | 6/2008 | Vau et al. | ............... | 348/345 |
| 2009/0009651 A1 * | 1/2009 | Takayanagi | ............... | 348/345 |
| 2009/0129693 A1 * | 5/2009 | Bloebaum et al. | ............... | 382/255 |
| 2009/0225189 A1 * | 9/2009 | Morin | ............... | 348/229.1 |

FOREIGN PATENT DOCUMENTS

| | | | |
|---|---|---|---|
| EP | 1335587 | | 8/2003 |
| EP | 1478176 | | 11/2004 |
| JP | 62291269 A | * | 12/1987 |
| JP | 2000032318 | | 1/2000 |
| JP | 2001-211351 | | 8/2001 |
| JP | 2002300463 | | 10/2002 |
| JP | 2003063338 | | 3/2003 |
| JP | 2004-343760 | | 12/2004 |
| JP | 2005055746 | | 3/2005 |
| WO | WO 00/72584 | | 11/2000 |

* cited by examiner

*Primary Examiner* — Jason Chan
*Assistant Examiner* — Cynthia Calderon
(74) *Attorney, Agent, or Firm* — Alfred A. Fressola; Ware, Fressola, Van Der Sluys & Adolphson LLP

(57) ABSTRACT

A method, module, device, and computer program product for digital imaging. Providing an image within an image sensor, selecting at least one first region within image for scaling with a first scaling rate, selecting at least one second region within the image for scaling with a second scaling rate, and providing the first and the second regions for further processing allows improved autofocusing.

31 Claims, 6 Drawing Sheets

Fig. 6b ed for viewfinder preview is, however, not high enough to perform accurate image based focusing in the modern multimegapixel, e.g. 3 megapixel cameras. In other words, the scaled down image resolution is not high enough to provide the basis for accurate image analysis to fine tune autofocusing. Therefore, before the image is captured, in addition to the aforementioned prefocusing measures, the camera needs to typically perform some final focusing steps based on higher resolution image data.

METHOD AND APPARATUS FOR DIGITAL IMAGE PROCESSING OF AN IMAGE HAVING DIFFERENT SCALING RATES

TECHNICAL FIELD

The present patent application relates in general to digital image processing within digital imaging devices.

BACKGROUND OF THE INVENTION

In the past years, digital imaging devices, such as digital cameras have taken a remarkable role in imaging technology. Traditional cameras rely entirely on chemical and mechanical processes, and there is generally no need for electricity to operate with one. However, digital cameras have one or more built-in processors and these cameras record images in an entirely digital form. Because of their electronic nature, digital cameras (or digital camera modules) can be readily integrated to other electronic devices, of which mobile telecommunication devices (mobile terminals) are nowadays the most common examples. Depending on the master device, (i.e. the device the camera module is integrated with) the camera module can communicate with several other components and systems of said device. E.g. in a camera phone, the camera module is typically operatively communicating with one or more processors, and in the case of a digital camera, the device can comprise some other type of dedicated signal processing components.

A digital camera has a series of lenses, a lens system that focuses light to create an image of a scene. But instead of focusing this light onto a piece of film, it focuses it onto a semiconductor device that records light electronically. This semiconductor device can be e.g. a CMOS (Complementary Metal Oxide Semiconductor) or CCD (Charge-Coupled Device) sensor. The sensor is mainly composed of a collection of light-sensitive pixels, which convert light into electrical charge and this electronic charge is further converted into digital image data. Typically, digital image data is mainly processed outside the sensor component itself, but nowadays it is also possible to integrate logic and memory into the CMOS sensors. U.S. Pat. No. 6,570,617 B2 discloses a single chip camera, where certain signal and control electronics have been integrated on the same substrate with the photo-sensitive element.

Deviating significantly from the conventional film type cameras, the modern digital cameras usually have integrated color displays that provide a preview of the frame that the user is capturing. This display can be used as a digital viewfinder instead of a traditional optical viewfinder. The image that is seen on the display is typically taken directly from the image sensor and after scaling down from its original resolution displayed on the viewfinder display. This procedure ensures rapidly updating live display during such preview mode. The preview image is also used for image based autofocusing purposes in the manner described below.

Typically, in the digital camera the image sensor outputs data in lower resolution QVGA (Quarter Video Graphic Array) for the display because of the aforementioned requirement to have rapidly updating preview display and because of the limited pixel resolution of the display. During preview mode image based autofocusing can be performed by analyzing the low-resolution image and by adjusting the lens system accordingly to improve the focusing. The user can check the image displayed on the viewfinder display to see if the autofocusing has been successfully applied. Also non-image based focusing can be applied here by using, for example, various distance measuring methods known in the art. This lowered image resolution intended for viewfinder preview is, however, not high enough to perform accurate image based focusing in the modern multimegapixel, e.g. 3 megapixel cameras. In other words, the scaled down image resolution is not high enough to provide the basis for accurate image analysis to fine tune autofocusing. Therefore, before the image is captured, in addition to the aforementioned prefocusing measures, the camera needs to typically perform some final focusing steps based on higher resolution image data.

The operation of the autofocusing and previewing functions of the prior art digital cameras may deviate in their details somewhat from the description given above, but it can be realized that the prior art systems have certain severe limitations especially with respect to providing exact focus data from megapixel images continuously and without unnecessary delays. It can be realized that in prior art systems exact focus data is not available all the time, because at certain times only a scaled down low resolution image intended for the viewfinder might be available. Also, in some cases when the high-resolution images are captured for final focusing, the viewfinder images might not be updated properly.

It can be seen that even though digital cameras provide new and interesting ways for imaging, there still is a need for improved focusing methods, which are more accurate and faster than the ones in current technology, and that can cope with the ever-increasing sensor resolutions. In addition, such methods should also work in situations where the image needs to be scaled down for generating a higher picture frequency, for example, for preview purposes. Automatic image processing, e.g. automatic white balancing should be possible with best results even with cropped images. The following description discloses a solution that addresses these needs.

SUMMARY OF THE INVENTION

To overcome one or more of the above mentioned problems, the application provides a method for digital imaging comprising providing a image with an image sensor, selecting at least one first region within the image for scaling with a first scaling rate, selecting at least one second region within the image for scaling with a second scaling rate; and providing the first and the second regions for further processing.

Another aspect of the application is an imaging module for digital imaging comprising an image sensor module for providing an image, a processor for providing a scaled partial resolution image based on said image, a selection unit for selecting at least one first region within the image for scaling with a first scaling rate, and one second region within the image for scaling with a second scaling rate.

A further aspect of the application is a computer program product for digital imaging with a computer program tangibly stored thereon, the program comprising instructions to operate at least one processor for providing an image with an image sensor, selecting at least one first region within the image for scaling with a first scaling rate, selecting at least one second region within the image for scaling with a second scaling rate, and providing the first and the second regions for further processing.

According to another aspect, which may as well be provided independently of the features of the above, the application provides calculating statistics for at least parts of the image, selecting a zoom region within the image, forwarding the zoom region for further processing, and forwarding the statistics for automatic white balancing. The scaling can be done in the image sensor or the camera processor.

This invention has considerable advantages when it comes to digital imaging and especially to the focusing and white balancing operation. Because of the invention, exact autofocus is available and white balancing is more accurate even with digital zooming. In addition, the image can always be kept in focus. The data rate at the interface between the image sensor and further processing means is capable of processing the image for constant reliable focusing as well as for presenting on a viewfinder of for taking videos. This method is applicable with still images and also in video imaging the autofocus is more accurate.

DETAILED DESCRIPTION OF THE DRAWINGS

Although specific terms are used in the following description for the sake of clarity, these terms are intended to refer only to the particular structure of the invention selected for illustration in the drawings and they are not intended to induly define or limit the scope of the invention. In the description a general term "image" is used for defining such forms of an image data that are visual. Examples of images are still image, video image and a preview image that is used during capturing process. "Raw image" in this description relates to such an image data that is not processed in any manner. Raw image is data that is captured by the image sensor but not interpreted. "Processed image" is a result from processed raw image data. The processed image can be interpreted visually, but not necessarily. An "imaging device" can be any device comprising means for digital imaging. Therefore, the imaging device can be a digital camera, imaging phone or some other device, that can either include imaging means or be connected to one (e.g. a web camera).

Figure 1:
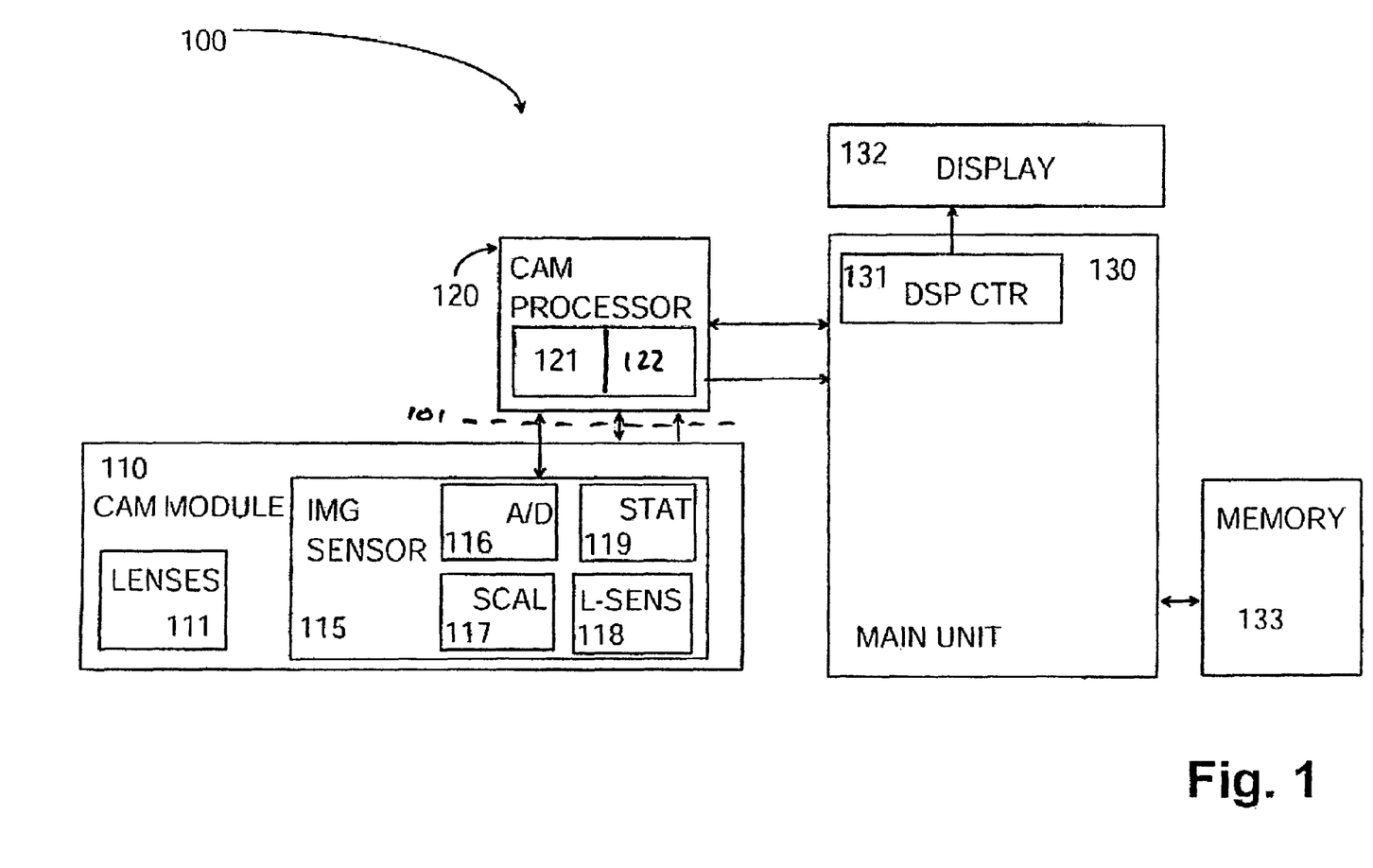
FIG. 1 illustrates an example of the imaging device structure.

An imaging device that implements the method disclosed by this application is now described by referring to FIG. 1, where an imaging device structure is presented in very simplified manner. The drawing of the imaging device presents such components of a digital camera, to which this method significantly contributes.

The imaging device 100 comprises a camera module 110, a camera processor 120 that can be an audiovisual engine, and a main unit 130. The purpose of the main unit 130 is to be in primary charge of the various applications of the device 100. The main unit 130 comprises, for example, a display controller 131 for controlling the display 132 of the imaging device 100. The main unit 130 is also arranged to store images and other information to a memory card 133 or other memory means. In addition, the main unit 130 can have communication means for forming a data transfer connection to external memory means such as a personal computer. These communication means can be a data cable or a wireless system. The main unit 130 may further have other capabilities or connections to other systems, components or databases, which improve efficiency and functionality of the imaging device.

In this example, the camera processor 120 comprises at least means for determining autofocus 121 and means for calculating automatic white balancing 122. The camera processor 120 may (depending on the situation) also be capable of processing the images according to known image processing methods. In this example, the camera processor 120 is illustrated as an independent component, but it should be appreciated that the camera processing functions can be carried out by a processor of the main unit 130. Other configurations are possible as well. The camera processor can be capable of selecting and scaling regions within the image. In particular, raw image data, or full resolution images can be scaled with scaling factors equal or greater than 1.

The camera module 110 and the camera processor are connected via an interface 101, which interface 101 provides a data bus and a control bus. The data bus might provide limited bandwidth for processing raw image data. The camera module 110 can be capable of selecting and scaling regions of raw images. The camera module 110 can be capable of receiving from the camera processor 120 information regarding the scaling rates and the regions to select.

The interface 101 is an example of an interface between the camera module 110 and the camera processor 120. The limited bandwidth of this interface 101 can prevent sending full sized raw data at fast enough to maintain a desired frame rate for viewfinder or video.

The image sensor 115 may have an architecture, which is similar to a Standard Mobile Imaging Architecture (SMIA). In this architecture, raw camera data can be scaled, e.g. for viewfinder or video, and/or cropped, e.g. for digital zoom, as a part of image processing chain in the camera.

A SMIA sensor can be described as a "stupid" module in the sense that, other than image scaling and cropping, it does not contain any hardware for image reconstruction. The camera module can output raw image data. The data can then be processed e.g. by software algorithms that run on separate processor engine 120 or by other computing hardware that is connected to the camera module.

The camera module 110 according to embodiments comprises lenses 111 via which the light is produced to an image sensor 115. In this example, the image sensor 115 comprises an analog-to-digital converter 116, means to introduce a gain and a light sensitive area 118. Some image sensors 115 can comprise only a gain, and some image sensors 115 may not.

It has been found that autofocus (AF) statistics cannot be calculated reliably from downscaled raw image data received from image sensor 115, because the reduced resolution may hide parts of focus errors. Therefore, AF statistics should be calculated from non-scaled raw image data.

If manual focus option is provided by the camera device, the user needs to see part of the image enlarged to full resolution in order to be able to see the focus accurately. Therefore, also for manual focus, raw image data is necessary.

However, the raw data may be required to be scaled down at the image sensor 115 side to be applied to the viewfinder display 132 or for video applications, because either the bandwidth of the interface 101 prevents sending full sized raw data at a fast enough rate, or there is not enough processing power at the receiving end to do the scaling for the full frame in addition to the image reconstruction, and still maintain the desired frame rate for viewfinder and video. The bandwidth of the interface 101 can be such that it limits the frame rate of the full sized raw image to 15 frames per second (fps).

To provide scaling within the image sensor 115, the image sensor 115 also comprises a video image scaler 117. The scaler 117 is arranged for providing scaling of the raw image data. The scaler 117 provides for scaling the resolution of the image to different scaling rates. The scaler 117 is arranged to change the resolution of a first region of the image to a scaling rate of 1:1, whereas a second or any further region can be scaled by 1:N, with N smaller or equal 1. The image sensor 110 can transmit the un-scaled first region and the scaled second region to the camera processor 120.

The autofocus means 121 can calculate autofocus statistics from the information within the un-scaled first region. The scaled second region, which can also overlap the first region, can be used together with a downscaled first region to be displayed on display 132.

By transmitting an un-scaled first region, AF and manual focus can be provided within the camera processor 120 from raw image data. The first region can be small enough so that the bandwidth of the interface 101 enables transmitting the raw data. The second region is scaled, so that the image data of the second region, which is preferably larger than the first region, can also be transmitted via the limited bandwidth interface 101.

It is also possible, that the camera processor 120 transmits information regarding the scaling rates and the regions to be selected to the camera module 110. The scaling of the second region can also be carried out in the camera processor.

Another problem occurs in case full sized raw image data is cropped for digital zoom. In this case, automatic white balancing (AWB) can be inaccurate. For AWB statistics collection, it may be beneficial to use image data outside this zoom region.

For providing automatic white balancing (AWB) the image sensor 115 can comprise statistical means 119. The statistical means 119 can operate on a full resolution image. The statistical means 119 can gather statistical information needed for compensating for different lighting conditions and color temperature so that white objects are perceived as white in most situations. The AWB adjusts the gains of different color components, e.g. R, G, and B, with respect to each other in order to make white objects white.

The AWB algorithm can be carried out within the means for AWB calculation 122, using the statistical data collected within statistical means 119.

The statistics collection and/or the scaling can also be carried out in the camera processor. Also the collection of image statistics can be carried out in the camera processor.

In general, it has to be noted that at least two regions can be provided with different scaling rates. One of the regions can be used for zooming. Only this region can be used as part of the image, and other regions can be cropped from the image. However, statistics of other regions can be helpful for image processing of the first region, e.g. for automatic white balancing. Therefore, statistics can be collected even from other regions. It can be helpful that the regions, which are not used for the image, but only for collection of statistics, are scaled prior to statistic collection to improve statistic collection. The scaling of the regions can be carried out separately within the camera module 110 or the camera processor 120.

Figure 2:
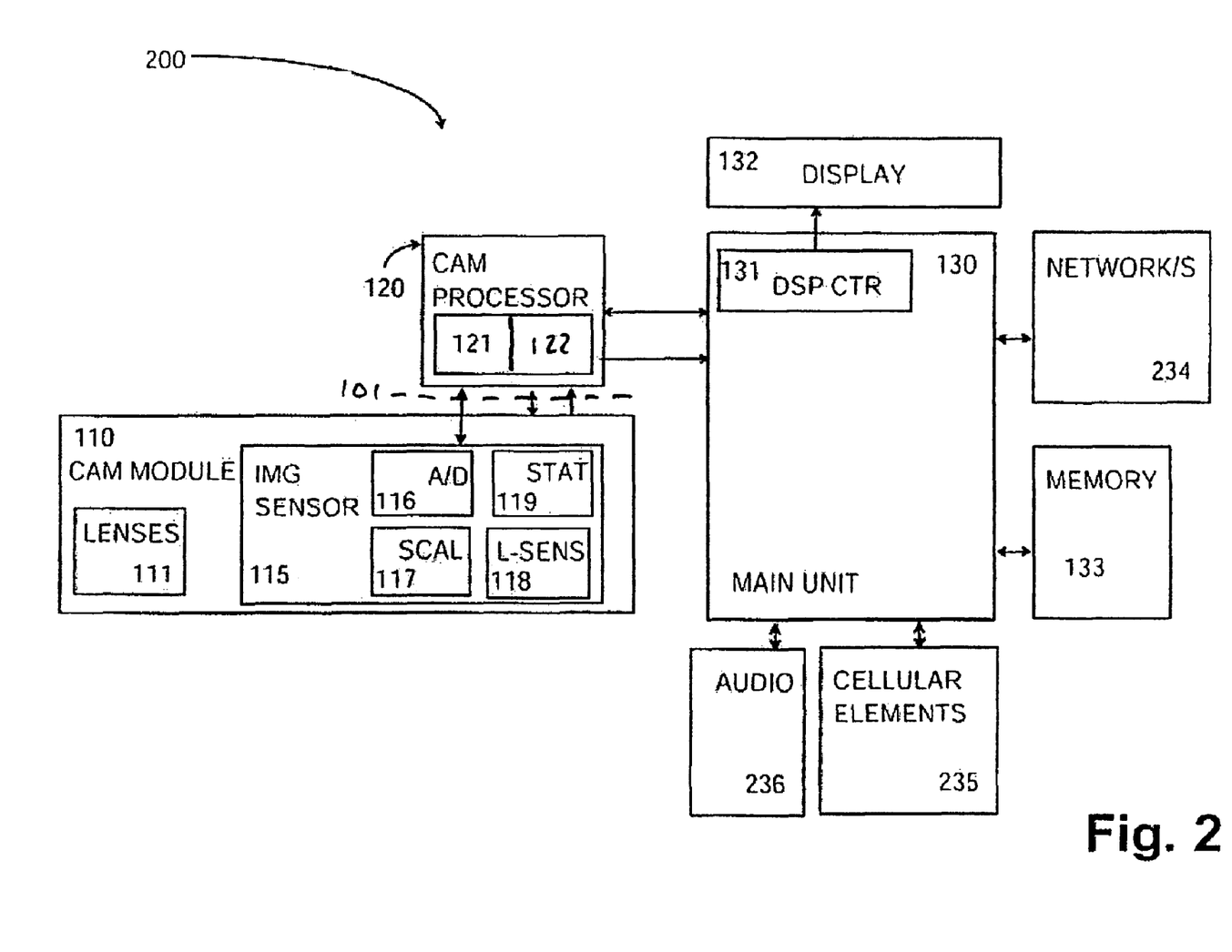
FIG. 2 illustrates another example of the imaging device structure.

Another example of the imaging device is illustrated in FIG. 2, wherein an imaging phone 200 is presented. The imaging phone 200 comprises the components described with reference to FIG. 1 but also such components that are needed with wireless communication functions. For example, in this FIG. 2 the device 200 comprises audio means 236, various networking means 234 and basic cellular components 235 (e.g. keyboard, power management). One skilled in the art will appreciate that the device 200 can incorporate other functions and components with the ones mentioned here.

Figure 3:
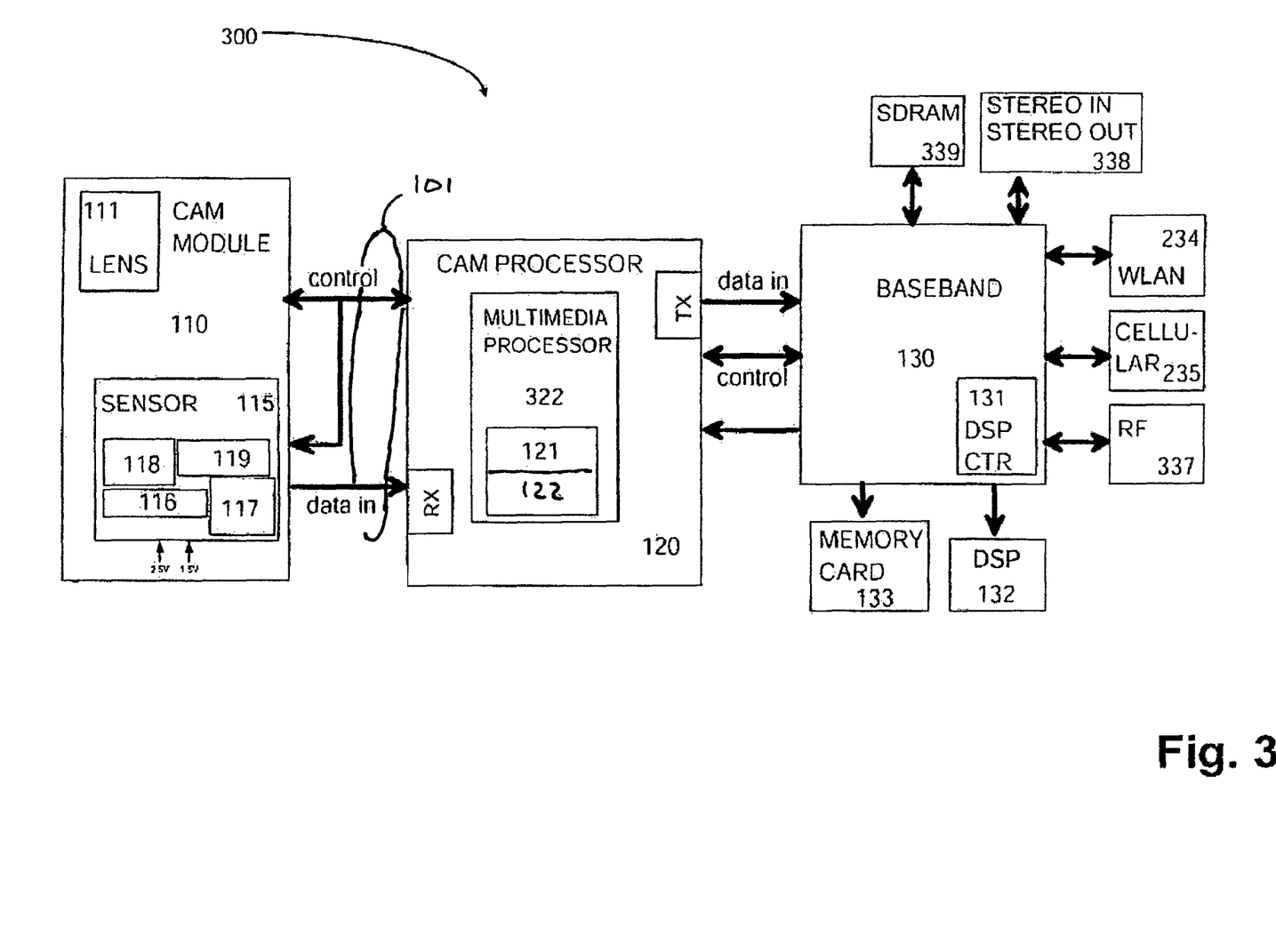
FIG. 3 illustrates yet another example of the imaging device structure.

Yet another example of the imaging device is presented in FIG. 3. The imaging phone 300 illustrated here is a bit more detailed drawing of the imaging phone 200 (FIG. 2). The means for determining the autofocus 121 and for AWB calculation 122 are in this figure arranged into multimedia processor 322. In this FIG. 3, the imaging phone comprises also a WLAN connection 234, but it will be evident that also this additional short range network capability can be some other short range network, e.g. Bluetooth or Infrared. Also into this FIG. 3 a receiver-transmitter 337 is illustrated. As a main memory, the imaging phone 300 of this example comprises SDRAM memory 339. As a main unit 130 in this figure operates a phone in baseband. Further the imaging phone 300 is capable of stereo input and stereo output 338. It will be appreciated by the man skilled in the art that, instead of the main unit, also the camera processor may be in connection with components, such as a display, an audio, a memory card or an external memory.

Figure 4:
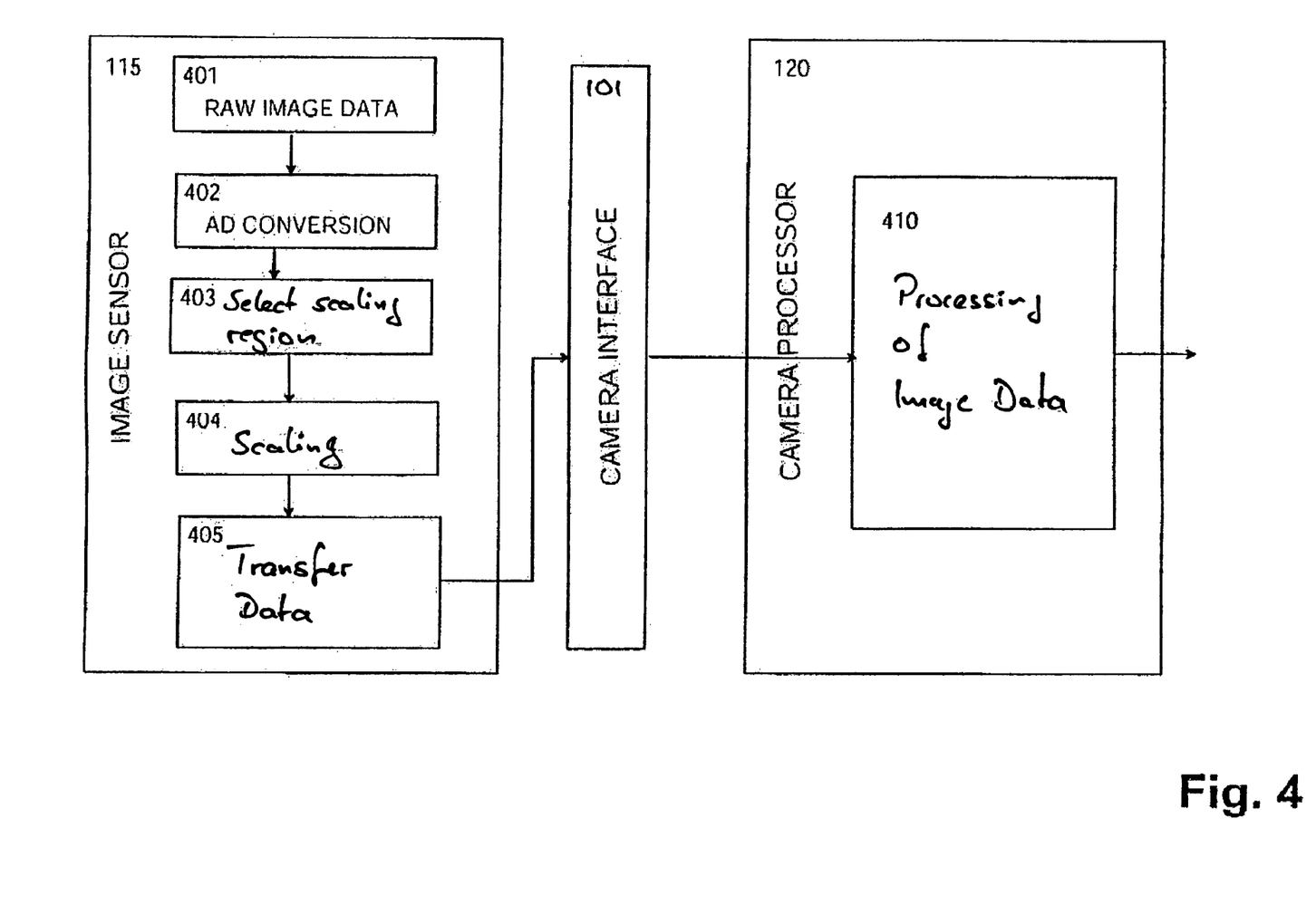
FIG. 4 illustrates an example of method steps and the division of them between two camera components.

To provide the camera processor with accurate data for AF calculation, for manual focus, the camera module 110 and the camera processor can be operated as illustrated in FIG. 4.

First, a full resolution image (raw image) is captured 401 in the camera sensor 120 and analog-to-digital conversion 402 is done in the A/D converter 116.

Figure 6A:
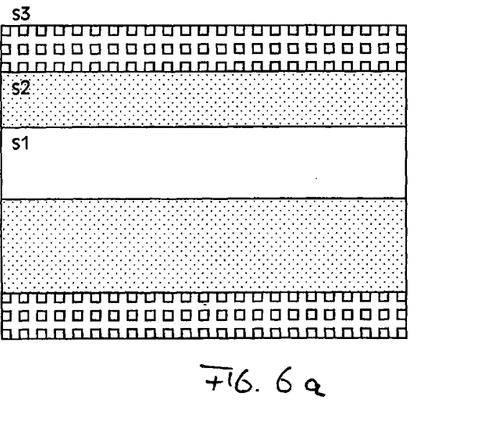
FIG. 6a illustrates an image with a first region, a second region, and a third region.

Then, the scaler 117 selects at least two regions 403 for scaling. FIG. 6a describes selection and scaling of three regions s1, s2, s3, which regions can be only be varied in the vertical direction. Such a selection can be beneficial with sensors using column AD converters 116. If row AD converters 116 are used, the direction can also be horizontal. The scaler 117 can also select the regions 403 before A/D conversion 402.

Figure 6B:
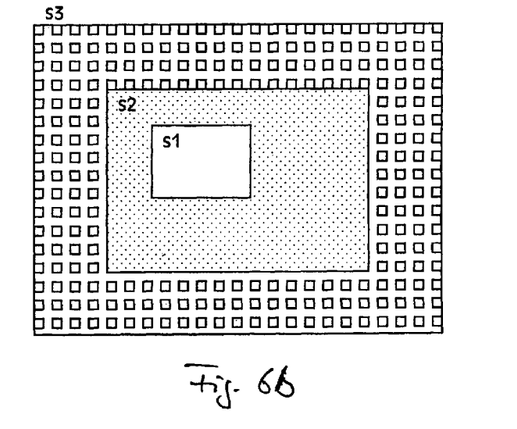
FIG. 6b illustrates another image with a first region, a second region, and a third region.

FIG. 6b illustrates a selection of regions s1, s2, s3, where their location and size are defined two-dimensionally.

After selection, the scaler 117 provides scaling of the regions 404. For example, the scaler 117 scales the regions s1, s2, s3 such that the lines of region s1 are not scaled at all, whereas lines of region s2 can be downscaled by some defined downscaling factor. The lines of region s3 can be downscaled or sub-sampled by some other defined factor.

The scaling factors N can be defined such that $1=N_1>=N_2>=N_3$, where N<1 means downscaling. For example, video or viewfinder images can be defining by region s2.

In order to provide accurate information for the AF algorithm or to the user in case of manual focus, region s1 of the image can be made non-scaled, while the regions s2, s3 can be scaled down, e.g. for viewfinder processing. It is possible to provide the camera module 10 with information concerning the regions and the scaling rate. For example, the size and position of the regions can be provided from the camera processor 120 to the camera module 110. It is also possible that the camera processor 120 provides the camera module 110 with scaling rates for the respective regions. This, however, is only applicable if region selection and/or scaling is carried out in the camera module 110. For regions where this is carried out in the camera processor 120, this information does not necessarily need to be transferred from the camera processor 120 to the camera module 110.

The un-scaled region s1 and the scaled region s2 can be transferred 405 from the camera module 110 to the camera processor 120 via interface 101.

It is also possible to transfer regions s1, and/or s2, and/or s3 un-scaled from the camera module 110 to the processor 120. The scaling of the un-scaled regions can be carried out in the processor 120. It is, however, important to note that different scaling rates can be applied onto different regions. Thus, different regions can satisfy different purposes, e.g. one region for imaging, and another region for statistic collection.

The camera processor 120 receives the data and can combine the different regions s1, s2, s3 so that a correct scaled full image can be produced 410.

If area s1 is used together with area s2, then the camera processor 120 needs to first gather statistics from the non-scaled area s1 for AF purposes, and then downscale it, so that it blends in with the image region s2. It may also be possible to use the region s1 in the original resolution to be displayed, e.g. to enable manual focus.

The border between regions s1 and s2 needs to be very accurate in order not to introduce any discontinuities to the final processed image. Therefore, it is possible to restrict the location, size, and the scaling factors of region s1 in relation to region s2 so that processing operations can be performed with full original lines/pixels. It may also be possible to provide region s2 with borders which overlap region s1, so that the camera processor 120 can combine the areas smoothly even with arbitrary scaling factors and location/size of area s1.

If the bandwidth of interface 101 does not allow sending region s1 and/or s2 at full resolution from the camera module 110 at the desired frame rate, then the camera module 110 may also need additional pixel buffers to handle the peak in transferred data that occurs when the full resolution lines are transferred.

The application can still reduce the required bandwidth at the interface 101, and the required processing power at the camera processor 120.

When applying AF, the camera processor 120 can make a decision for moving the lenses or for maintaining the current position of the lenses. The camera processor 120 can gather statistical data from the region s1, which is raw image data and can decide on these statistical data, which way the lenses should be moved without going through the entire image data. The camera processor 120 may decide which block in the image is used for focusing. A decision for lens movement based only on analysis of the downscaled image would be inaccurate, and therefore the method according to the invention is preferable over the prior art methods.

The focusing decision is based on statistical data obtained from region s1. Depending on the characteristics of the image sensor and a last focused value, at least one target value can be defined for decisions. The statistical data is compared to the target value, and lenses are moved according to how much the current statistical data deviated from said target value. When a statistical datum is less (worse) than the target value, the lenses are moved into that direction which is supposed to be the better direction. When the moving is done, the statistical datum is checked and if the result is good enough, the lenses are kept at that place. If the result is better, but not good enough, the moving is continued into that direction. If the result is worse the lenses are moved into opposite direction, where the statistical datum is checked and a decision of the next step is made. If the result improved sufficiently, the lenses are kept at that place or, if needed, the next place can be checked as well. If the result is worse also here, the lenses are brought back to the original place. The target value is redefined. In every step the target value is redefined when the lenses are moved to a new place or back to a previous place. If the target value becomes too bad, it may indicate that the focus is lost, whereby the scanning can be redone in the whole focus area. It should be also noticed that whether there are statistical data from many different frequencies, it is possible to examine from their changes when the focus is improved and into which direction the lenses should be moved. It also enables observations for when the focusing is needed. For example, the lower the frequency band best target value ends up, the more likely the lenses should be moved into some direction.

Figure 5:
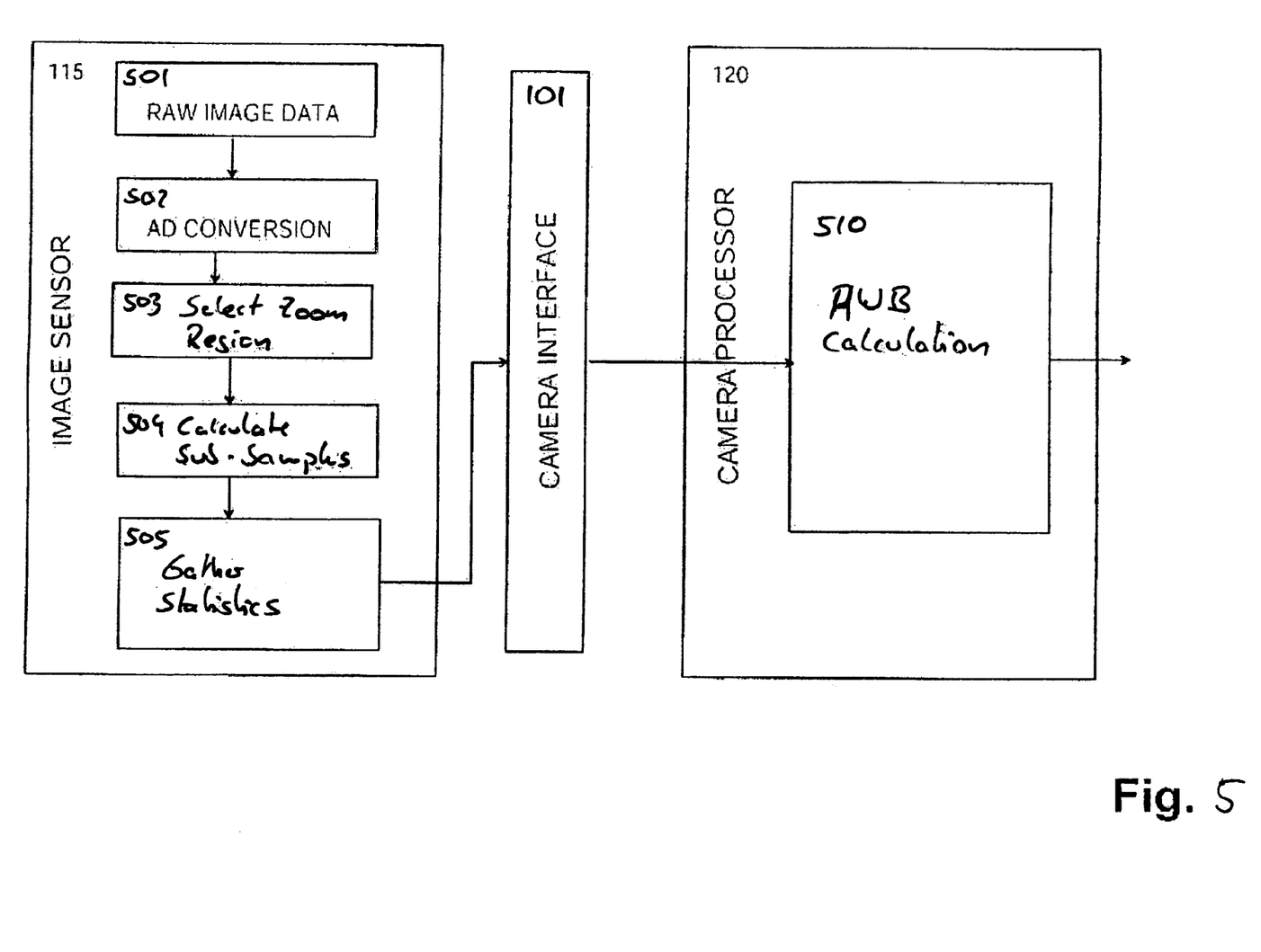
FIG. 5 illustrates another example of method steps and the division of them between two camera components.

Calculation of AWB is illustrated in FIG. 5. First, a full resolution image is captured 501 in the image sensor 115 and analog-to-digital conversion 502 is done in the A/D converter 116. Then, the scaler 117 selects at least one region 503 for zooming. This can be a region s2 as illustrated in FIG. 6. The image can be cropped to this zoom region s2 and only this data can be transferred to the camera processor. The scaler 117 can also select the regions 503 before A/D conversion 502.

However, AWB within the camera processor 120 is inaccurate if only applied on the cropped zoom region s2. AWB is more accurate by using the whole image area information. Therefore, in addition to the zoom region s2, the region s3 representing the full image can be sub-sampled 504. The sub-samples of the raw image data within region s3 can be utilized for AWB statistics. The sub-samples of the raw image data in region s3 can be evenly spaced. The statistics means 119 can gather image statistics 505 used for AWB from the sub-samples in region s3 and region s2. The scaling of the different regions can also be done in the processor 120. The statistics can also be gathered in the camera processor 120. It is important that for different regions different scaling factors can be applied, and statistics can be gathered for selected regions, selectively.

The image data of the zoom region together with the statistics for AWB from the region s3 can be transferred via camera interface 101 to camera processor 120 for AWB processing 510. Further pedestal removal, vignetting elimination and noise reduction can be carried out on the AWB statistics from region s3 in camera processor 120.

In the examples, the image sensor is a CMOS sensor, where logic and memory can be integrated on the same substrate as the photosensitive elements. However, the invention is not limited to the use of CMOS sensors. CCD sensors, and other image sensors may be used as well when they are arranged to incorporate suitable circuitry and logic for image scaling.

Anyone skilled in the art will appreciate that the system may incorporate any number of capabilities and functionalities, which are suitable to enhance the efficiency of the focusing functions. Additionally the system may provide other manual or automatic services for maintaining data.

Therefore, it will become evident that variations and modifications of the examples of embodiment described are possible without departing from the scope of protection of the invention as set forth in the claims.

What is claimed is:
1. A method comprising:
  detecting a full resolution image at an image sensor;
  adaptively selecting, at the image sensor, at least one first full resolution region within the detected full resolution image for adaptively scaling with a first scaling rate;
  adaptively selecting, at the image sensor, at least one second full resolution region, different from the at least one first full resolution region, within the detected full resolution image for adaptively scaling with a second scaling rate, different from the first scaling rate;
  adaptively scaling, at the image sensor, the selected at least one first full resolution region within the detected full resolution image using the first scaling rate to provide a first scaled region;

adaptively scaling, at the image sensor, the selected at least one second full resolution region within the detected full resolution image using the second scaling rate to provide a second scaled region; and providing the first scaled region and the second scaled region for further processing, wherein the further processing comprises calculating autofocus information using at least the first scaled region wherein the autofocus information is configured to control automatically a focusing quality of the first region by positioning at least one lens.

2. The method of claim 1, further comprising receiving within the image sensor at least one of:
A) information concerning the selection of regions, and
B) information concerning the scaling rates.

3. The method of claim 1, further comprising providing an image for at least one region.

4. The method of claim 1, wherein the further processing comprises reconstructing the detected full resolution image outside the image sensor using the first scaled region and the second scaled region and storing the reconstructed full resolution image.

5. The method of claim 1, wherein the first scaling rate is a 1:1 scaling rate providing a first full resolution image within the selected first full resolution region.

6. The method of claim 1, wherein the second scaling rate is 1:N scaling rate, with N smaller than 1, providing a second downscaled resolution image within the selected second full resolution region.

7. The method of claim 1, wherein the autofocus information is calculated outside the image sensor.

8. The method of claim 7, wherein the autofocus information comprises at least statistical information of the first region.

9. The method of claim 1, further comprising providing at least the first scaled region for manual focus information.

10. The method of claim 9, wherein the first scaled region is scaled for displaying on a viewfinder display and is used for the manual focus information.

11. The method of claim 1, wherein the first full resolution region is located at least partially within the second full resolution region and wherein the content of the first full resolution region is scaled with the first scaling rate and the second scaling rate.

12. The method of claim 1, wherein the first full resolution region is located at least partially within the second full resolution region and wherein the first full resolution region is re-scaled outside the image sensor with the second scaling rate.

13. The method of claim 1, further comprising providing at least the second region to at least one of
A) a viewfinder display; and
B) a video unit.

14. The method of claim 1, further comprising restricting the first scaling rate in relation to the second scaling rate providing smooth borders between the first scaled region and the second scaled region.

15. The method of claim 1, further comprising selecting the first full resolution region and the second full resolution region with overlapping boundaries.

16. The method of claim 1, further comprising buffering image information within the image sensor.

17. The method of claim 1, wherein the first full resolution region and the second full resolution region border each other on at least one of
A) a horizontal line, and
B) a vertical line.

18. The method of claim 1, further comprising:
calculating statistics for at least parts of the detected full resolution image;
selecting a zoom region within the detected full resolution image;
forwarding the zoom region for further processing; and
forwarding the statistics for automatic white balancing.

19. The method of claim 18, wherein the statistics are calculated from subsamples of the detected full resolution image.

20. The method of claim 18, wherein the subsamples are equally spaced within the detected full resolution image.

21. The method of claim 18, further comprising carrying out on the statistics at least one of
A) pedestral removal;
B) vignetting elimination; and
C) noise reduction.

22. The method of claim 18, wherein the zoom region is cropped from the detected full resolution image within the image sensor and wherein the zoom region is further processed for providing digital zooming.

23. A method of claim 1, further comprising moving the at least one lens to reduce a deviation between a target value and the autofocus information.

24. An imaging module comprising:
an image sensor module configured to detect a full resolution image;
a scaler spatially located on the image sensor configured to adaptively select at least one first full resolution region within the detected full resolution image for adaptively scaling with a first scaling rate to provide a first scaled region, and at least one second full resolution region within the detected full resolution image, different from the at least one first full resolution region, for adaptively scaling with a second different scaling rate to provide a second scaled region, and to provide the first scaled region and the second scaled region for further processing, wherein the further processing comprises calculating autofocus information using at least the first scaled region wherein the autofocus information is configured to control automatically a focusing quality of the first region by positioning at least one lens.

25. The module of claim 24, wherein the image sensor comprises an interface providing the first scaled region and the second scaled region for further processing outside the image sensor.

26. The module of claim 24, wherein the scaler is arranged to scale at least one of the regions with a scaling rate of 1:N, with N smaller than 1.

27. The module of claim 24, wherein the image sensor is a CMOS sensor.

28. A digital camera comprising an imaging module of claim 24.

29. A mobile phone comprising an imaging module of claim 24.

30. A computer readable memory stored with instructions to operate at least one processor for:
detecting a full resolution image at an image sensor;
adaptively selecting, at the image sensor, at least one first full resolution region within the detected full resolution image for adaptively scaling with a first scaling rate;
adaptively selecting, at the image sensor, at least one second full resolution region, different from the at least one first full resolution region, within the detected full resolution image for adaptively scaling with a second scaling rate, different from the first scaling rate;

adaptively scaling, at the image sensor, the selected at least one first full resolution region within the detected full resolution image using the first scaling rate to provide a first scaled region;

adaptively scaling, at the image sensor, the selected at least one second full resolution region within the detected full resolution image using the second scaling rate to provide a second scaled region; and providing the first scaled region and the second scaled region for further processing, wherein the further processing comprises calculating autofocus information using at least the first scaled region wherein the autofocus information is configured to control automatically a focusing quality of the first region by positioning at least one lens.

31. A computer readable memory as claimed in claim 30 stored with instructions to operate at least one processor for receiving within the image sensor at least one of (A) information concerning the regions, and (B) information concerning the scaling rates.

* * * * *